United States Patent [19]
Rubino et al.

[11] Patent Number: 5,990,209
[45] Date of Patent: Nov. 23, 1999

[54] COPOLYMERS OF PROPYLENE WITH POLYMERIZABLE HINDERED AMINE LIGHT STABILIZERS

[75] Inventors: Mark R. Rubino, Pittsburgh; Steve Mulhall, Monroeville; Edmund P. Whitby, III, Wexford, all of Pa.; Akiyoshi Onishi, Tsu; Makoto Terauchi, Yokkaichi, both of Japan

[73] Assignees: Aristech Chemical Corporation, Pittsburgh, Pa.; Mitsubishi Chemical Corporation, Tokyo, Japan

[21] Appl. No.: 08/846,045

[22] Filed: Apr. 25, 1997

[51] Int. Cl.⁶ ........................................ C08K 5/34
[52] U.S. Cl. ..................... 524/99; 524/100; 524/102; 524/103; 524/204
[58] Field of Search ............... 524/99, 100, 102, 524/103, 204

[56] References Cited

U.S. PATENT DOCUMENTS

| | | | |
|---|---|---|---|
| 3,755,279 | 8/1973 | Langer et al. | 260/88 |
| 3,975,357 | 8/1976 | Murayama et al. | 260/45.8 |
| 4,426,471 | 1/1984 | Berner | 524/91 |
| 4,743,657 | 5/1988 | Rekers et al. | |
| 4,857,230 | 8/1989 | Matsumura | 524/99 |
| 4,857,595 | 8/1989 | Kazmierzak et al. | 525/142 |
| 4,863,999 | 9/1989 | MacLeay et al. | 525/142 |
| 4,868,246 | 9/1989 | MacLeay et al. | 525/142 |
| 4,929,652 | 5/1990 | Gugumus | 524/99 |
| 4,960,593 | 10/1990 | Sevini et al. | 524/99 |
| 4,975,489 | 12/1990 | Kazmierzak et al. | 525/142 |
| 5,030,670 | 7/1991 | Hess et al. | 524/99 |
| 5,350,786 | 9/1994 | Costanzi et al. | 524/102 |
| 5,455,289 | 10/1995 | Caselli | 523/223 |
| 5,679,733 | 10/1997 | Malik et al. | 524/99 |

FOREIGN PATENT DOCUMENTS

92/12201  7/1992  WIPO ................................. 524/99

OTHER PUBLICATIONS

Wilen, Markku, and Nasman, "Preparation of Hindered Piperidine and its Copolymerization with Propylene over a High Activity Z–N Catalyst" J. Polymer Science: Part A: Polymer Chemistry, v 30, 1163–1170 (1992).

*Primary Examiner*—Bernard Lipman
*Assistant Examiner*—N. Sarofim
*Attorney, Agent, or Firm*—William L. Krayer

[57] ABSTRACT

Copolymers are disclosed of lower alpha-olefins and HALS-containing monomers, typically 1-(10-undecenyl)-2,2,6,6-tetramethylpiperidine. They may be used for light or heat stabilizing, by themselves or in blends with other polymers.

7 Claims, No Drawings

COPOLYMERS OF PROPYLENE WITH POLYMERIZABLE HINDERED AMINE LIGHT STABILIZERS

TECHNICAL FIELD

This invention relates to copolymers of lower alpha-olefins and tertiary hindered amines having polymerizable olefinic substituents. In particular, it relates to copolymers of propylene with 2,2,6,6-tetraalkylpiperidines having terminal alkenes at the 1-position. Most particularly, it relates to copolymers of propylene and the preferred comonomer 1-(10-undecenyl)-2,2,6,6-tetramethylpiperidine (hereinafter sometimes called "1-10UTMP").

This invention includes blends of our new copolymers with thermoplastic resins such as propylene homopolymers and copolymers and other alpha-olefin polymers, methods of protecting injection-molded products and extruded products against light and thermal degradation, and medical products incorporating the copolymers, such as syringes and nonwoven fabrics, and products incorporating the copolymers used in the open air, such as fibers and films.

BACKGROUND OF THE INVENTION

Prior to the present invention, it has been an important objective in the polyolefin industry to develop polyolefins which are resistant to thermal degradation and the degradation caused by exposure to light and ultraviolet rays. Various kinds of hindered amines—"hindered amine light stabilizers" ("HALS")—have been widely used for these purposes. They have been found to be effective in stabilizing against light when blended into the polyolefin, but migration and leaching out by the relatively mobile hindered amines can result in reduced effects against light. On the other hand, oligomeric hindered amine light stabilizers, such as Chimassorb 944 and the like, generally do not migrate or leach out. But these stabilizers have been found to be less effective in stabilizing against light, compared with relatively mobile hindered amine light stabilizers. Furthermore, since currently commercially available HALS can not adequately protect against heat, thermal stabilizers have to be added. Many commonly used HALS, however, show negative synergy with the most widely used class of thermal stabilizers, phenolic antioxidants. It would be highly desirable to have a light stabilizer which does not show negative synergy with phenolic stabilizers at high temperatures. Thus the art is constantly looking for improved methods of protecting polyolefins and polyolefin products from degradation caused by light and heat.

So far as we are aware, a practical copolymer of propylene or other alpha-olefin has not been made with a comonomer containing an effective hindered amine light stabilizer as a structural unit, hereinafter sometimes called HALS comonomer. Such a copolymer would be highly desirable not only for medical applications as mentioned above, but for other applications of polypropylene which require resistance to degradation from heat and visible light. Some types of medical products would benefit from protection against degradation caused by repeated autoclaving. Such copolymers containing relatively low concentrations of HALS comonomers could be used by themselves and would be expected to withstand the conditions of injection molding; similar copolymers, perhaps containing higher concentrations of HALS comonomers, could be blended with less expensive propylene homopolymers, and would not migrate as the unattached hindered amines have been known to do.

In U.S. Pat. No. 3,975,357, Murayama et. al. describe a large class of N-substituted 2,2,6,6-tetramethylpiperidines which may be used as heat and light stabilizers. The described class includes compounds of the formula

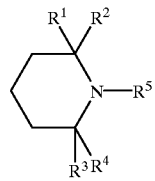

where $R^1$, $R^2$, $R^3$ and $R^4$ can be methyl and $R^5$ can be an alkenyl group of 3–10 carbon atoms. No attempt was made to copolymerize them, however; they were simply blended with a host polymer to stabilize it, in a manner no different than many other unpolymerizable stabilizer additives.

In U.S. Pat. Nos. 4,857,595 and 4,975,489, Kazmierzak and MacLeay describe "polymer-bound" hindered amine light stabilizers. The polymers are made to contain hindered amines by reacting hydrazido substituted hindered amines with, for example, maleic anhydride modified polypropylene. Similar reactions are described by MacLeay and Myers in U.S. Pat. Nos. 4,683,999 and 4,868,246. One must first make the maleic anhydride-modified resin, however, an expensive separate step which tends itself to degrade polypropylene or other thermoplastics. While the HALS-containing moiety is polymer-bound, it is not incorporated in the polymer backbone by original copolymerization. See also German patent 4,436,355 to Bartus et al (Chemie Linz) and U.S. Pat. No. 4,473,657 to Rekers et al (Deering Milliken) which use HALS maleimides to combine in a reactor/extruder with preformed polymers, making grafted polymer-bound hindered amine light stabilizers. These materials also do not employ the HALS component as an original comonomer with the propylene or other original α-olefin monomer.

Other types of grafting attempts are described in Japanese JP Kokai 25330/94. Grafting onto functional groups such as aldehyde groups has definite disadvantages, such as low yields associated with undesirable unreacted monomer, and degradation of the physical properties of the base polymer.

Sevini and Noristi, in U.S. Pat. No. 4,960,593, propose the intimate incorporation of free hindered amines in polypropylene by including them in the polymerization reaction mixture at the time of initiation of the reaction, or sometime during the course of the reaction, or afterwards but before the catalyst is quenched. As stated at the end of their Example 10, the timing of the addition is not critical; the inventors perceive no difference so long as the HALS compound is introduced before the catalyst is quenched. Thus, in spite of the fact that their vastly comprehensive general formulas include compounds employed in the present invention, it is clear that the patentees do not intend to copolymerize them; in fact, all but a few of their HALS compounds could not possibly copolymerize, being without polymerizable functional groups. The HALS compounds are simply incorporated into the mixture in perhaps a more intimate manner than has been the case for more conventional polyolefins in which the HALS compound is blended after the catalyst is quenched. Neither this patent nor any other of which we are aware discloses a copolymer of propylene with a copolymerizable hindered tertiary amine compound of the formula (I) below.

We are aware of the work of Wilen, Markku, Auer and Nasman, J. Polymer Sci., Part A-Polymer Chemistry, v 30, 1163–1170 (1992), who copolymerized certain hindered secondary amines with propylene. The polymerizable group was attached to the 4-position of the piperidine group, such as in 4-(hex-5-enyl)-2,2,6,6-tetramethylpiperidine. Because this reactant is a secondary amine, i.e. the 1-position is >NH, polymerization catalytic activity is drastically reduced and can only be restored by using excessively large amounts of triethyl aluminum (TEA); multiple reactions are needed to obtain significant yields. We use hindered amines, by contrast, in which the polymerizable group is at the 1-position of the piperidine group, making the amine a tertiary amine.

Langer and Haynes, in U.S. Pat. No. 3,755,279, use as comonomers 1-alkenylpiperidines which are hindered only enough to avoid destruction of the polymerization catalyst, yet the amine sites can be used for dyeing. The 2- and 6-positions of the piperidine are occupied by only one alkyl group each. These compounds are not highly hindered around the nitrogen atom and their efficacy as a light stabilizers is expected to be much less than our comonomers. The present application is concerned particularly with 1-alkenyl piperidines wherein the 2- and 6- positions are fully substituted to develop the light and heat stabilization.

SUMMARY OF THE INVENTION

The present invention includes a range of copolymers of propylene and/or other lower alpha-olefins with hindered amine comonomers having an alkenyl group, such as 1-(omega-alkenyl)-2,2,6,6-tetraalkylpiperidines which have a double bond at the free end of the alkene attached to the nitrogen of the piperidine group. The omega- alkenes have at least five carbon atoms or as many as 23, and the 4-position on the piperidine ring is free of functionality poisonous to the catalyst used for polymerization but can have an alkyl, aryl, or, aralkyl group. The alkyl groups in the 2- and 6-positions on the piperidine are preferably methyl groups, but may be ethyl groups, as shown in Formula I:

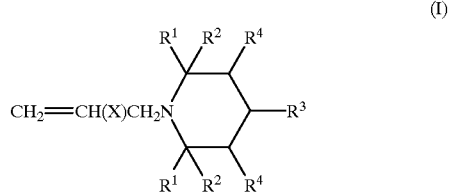
(I)

where each $R^1$ is selected from methyl and ethyl groups, each $R^2$ is selected from methyl and ethyl groups, and each $R^4$ is hydrogen or methyl. $R^3$ is free of functionality poisonous to the polymerization catalyst and may be hydrogen or alkyl, aryl, or aralkyl groups having from one to eight carbon atoms. (X) is a divalent hydrocarbyl fragment containing from two to twenty carbon atoms; the term hydrocarbyl is intended to include benzyl groups and other cyclic hydrocarbon groups as well as branched chain alkylene groups—that is, (X) may be a divalent linear or branched alkylene, arylene, or aralkylene fragment having 2–20 carbons; the linear portions may contain one or two unsaturated groups. The other, heretofore unspecified 3-, 4-, and 5-positions on the piperidine rings are occupied by hydrogen. Preferably (X) is $(CH_2)_n$ where n is 2–11, $R^1$ and $R^2$ are methyl groups, and $R^3$ and each $R^4$ is hydrogen. The preferred hindered amine comonomer is 1-(10-undecenyl)-2,2,6,6-tetramethylpiperidine ("1-10UTMP"). We have found that this comonomer may be readily copolymerized with propylene.

As will be seen below, the copolymers of our invention can be made using a supported Ziegler-Natta catalyst following procedures more or less conventional for making polyolefins, particularly polypropylene. We may use any supported Ziegler-Natta catalyst capable of polymerizing propylene. Conventional unsupported Ziegler-Natta catalysts may also be used.

The copolymers of our invention provide light stability for polyolefins and show no sign of negative synergy with phenolic heat stabilizers. Polyolefins including our copolymers can be used to make medical devices which are protected against degradation after thermal sterilization; our invention includes medical devices so made, such as syringes.

The preferred form of the hindered amine portion of our HALS comonomer includes 2,2,6,6-tetraalkyl-substituted piperidines wherein the alkyl substitutions at the 2- and 6-positions have from one to two carbon atoms, the 3- and 5-positions may each be substituted with a methyl group, and the polymerizable function is attached at the 1-position as an omega-alkenyl chain.

Our preferred copolymers comprise about 99.99999 to about 85 mole percent $C_2$-$C_8$ alpha-olefins and about 0.00001 to about 15 mole percent olefinically polymerizable hindered amine light stabilizer of Formula (I), which is refered to as HALS comonomer. In particular, we prefer to use propylene as the olefin or a mixture of propylene and other $C_2$-$C_8$ olefins wherein the propylene comprises at least 50 mole percent of the olefins. The preferred HALS comonomer will be a 1-alkenyl-2,2,6,6-tetramethylpiperidine wherein the alkenyl group has 6-14 carbon atoms with an unsaturation at the free end of the group; in particular, we prefer to use 1-(10-undecenyl)2,2,6,6-tetramethylpiperidine, 1-10UTMP.

The copolymers can be used by themselves for molding and other typical polyolefin uses; in addition they can be blended, preferably in a molten state, with a host resin, preferably a polyolefin, preferably also in a molten state. Suitable host resins include homopolymers of propylene, and copolymers and terpolymers of propylene with other lower α-olefins, for example random copolymers of propylene with ethylene, and random copolymers of propylene with ethylene and another lower α-olefin, and "impact copolymers," wherein a reactor blend may be made of ethylene-propylene copolymers dispersed in a continuous phase of propylene homopolymer. Blending or compounding may be accomplished in a single screw extruder, double-screw extruder, Brabender-type mixer, and/or the like. Premixing may be accomplished as powders, in emulsions, in master batches, as may best suit the particular objectives of the practitioner. Our invention includes blends of our copolymers with host resins, the copolymers being included and blended in amounts effective to inhibit thermal or light degradation of the host resin. The practitioner may choose the desired concentration of copolymer to provide, preferably, at least $10^{-7}$, preferably up to $10^{-4}$, mole of HALS comonomer unit based on Formula (I) per gram of the finished blend, to obtain good light stabilization as well as heat stabilization without any sign of negative synergy when used with phenolic antioxidants.

Our copolymers, and compositions containing them, can be used in a wide range of applications, such as molding materials, tape, film, monofilaments, multifilaments, fabrics, non-woven fabrics, coating materials, and the like. Especially, they are suitable for medical applications, such as syringes and non-woven fabrics or applications used in the open air, such as nets, protective film, and automobile bumpers.

DETAILED DESCRIPTION OF THE INVENTION

Our invention utilizes a hindered tertiary amine, a monomeric piperidine of the above formula (I), to copolymerize with a lower alpha-olefin or mixture of lower alpha-olefins, preferably propylene alone. Preferably the HALS-containing monomer will have an omega-alkenyl group in the 1-position which contains five to fourteen carbon atoms.

A convenient way to make our preferred monomer 1-(10-undecenyl)-2,2,6,6-tetramethylpiperidine in the laboratory was demonstrated as follows.

Preparation of 1-(10-undecenyl)-2,2,6,6-tetramethylpiperidine 2459 g of N-methylpyrrolidinone and 1013 g 2,2,6,6-tetramethylpiperidine were stirred and heated under inert atmosphere at atmospheric pressure. Granular potassium iodide (527 g) was added gradually over 45 minutes. At a slurry temperature of 112° C., 11-bromo-1-undecene (647 g) was added. The temperature was raised to 120° C. within 15 minutes, maintained at 120–135° C. for three hours and 100–120° C. for four hours. The slurry was cooled to room temperature and partitioned between aqueous NaOH and hexane to give two homogeneous liquid layers. The upper organic layer was separated and distilled below atmospheric pressure to remove a volatile mixture including hexane and tetramethylpiperidine (TMP). The portion remaining after hexane and TMP removal was distilled at 155–164° C./3 mmHg to give 704 g of 1-(10-undecenyl)-2,2,6,6-tetramethylpiperidine (98% purity by GC) as a colorless liquid. The structure was identified by NMR, GC-MS, and High Resolution MS.

EXAMPLE 1

Preparation of propylene/1-(10-undecenyl)-2,2,6,6-tetramethylpiperidine copolymer using a bench-scale pressurized reactor To a one-gallon stainless steel reactor under propylene purge were added 550 ml of hexane, 900 ml of 1-(10-undecenyl) tetramethylpiperidine (1-10UTMP), 25 ml of 10 wt% triethyl aluminum (TEA) solution in hexane, 4 ml of diphenyldimethoxysilane (DPMS), and 1800 mg of titanium tetrachloride catalyst supported on magnesium chloride. The mixture was held at 25° C. under a propylene atmosphere at 15 psig for 15 minutes. The reactor was vented and 225 mL of 25 wt% TEA in hexane was added. After a brief purge with propylene, 241 ml (STP conditions) of hydrogen was added to the closed vessel, and the feeding of propylene was started. The temperature was allowed to rise to 75° C. and the pressure to 50 psig. After 5 hours at the temperature and pressure, the polymerization was stopped. The product copolymer was separated, washed with isopropanol and dried. The yield was 800 g, and the melt flow index of the product copolymer was 91.5. The $^{13}$C-NMR analysis showed the copolymer contained 4.2 mole percent of 1-10UTMP units.

EXAMPLES 2–4

Preparation of propylene/1-(10-undecenyl)-2,2,6,6-tetramethylpiperidine copolymer under atmospheric pressure Copolymerization was similarly carried out in n-heptane using a glass vessel under atmospheric pressure with continuous feeding of propylene with the same supported titanium tetrachloride catalyst as the Example 1. The inputs and results are summarized in the Table 1 below:

TABLE 1

|  |  | Example 2 | Example 3 | Example 4 |
|---|---|---|---|---|
| n-Heptane | (ml) | 29 | 30 | 25 |
| 1-10UTMP | (g) | 0.93 | 1.86 | 4.65 |
| TEA 25 wt % | (ml) | 5.0 | 5.0 | 5.0 |
| DPMS | (µl) | 51 | 51 | 47 |
| Catalyst | (mg) | 42 | 42 | 47 |
| Polymerization time* | (h) | 0.25 | 1.0 | 0.25 |
| Yield | (g) | 2.9 | 6.6 | 2.5 |
| Comonomer** | (mol %) | 0.16 | 0.32 | 2.19 |

*Polymerization temperature: 50° C.
**Comonomer content in copolymer as mol % determined by $^{13}$C-NMR

EXAMPLES 5 AND 6

Preparation of propylene/1-(4-pentenyl)-2,2,6,6-tetramethylpiperidine copolymer

Following the above glass vessel procedure, propylene and 1-(4-pentenyl)-2,2,6,6-tetramethylpiperidine (1-4PTMP) were copolymerized. The runs were conducted for 2 hours at 50° C. at a pressure of 1 atmosphere. Specific conditions and results are shown in Table 2:

TABLE 2

|  |  | Example 5 | Example 6 |
|---|---|---|---|
| n-Heptane | (ml) | 100 | 0 |
| 1-4PTMP | (g) | 20.93 | 30.35 |
| TEA 25 wt % | (ml) | 7.0 | 5.0 |
| DPMS | (µl) | 106 | 55 |
| Catalyst | (mg) | 76 | 196 |
| Polymerization time* | (h) | 2.0 | 2.0 |
| Yield | (g) | 15.4 | 14.73 |
| Comonomer** | (mol %) | trace | 0.64 |

*Polymerization temperature: 50° C.
**Comonomer content in copolymer as mol % determined by $^{13}$C-NMR

COMPARATIVE EXAMPLE 1

Seven different attempts to copolymerize 1-(allyl)-2,2,6,6-tetramethylpiperidine with propylene following the above glass vessel procedure at various ratios of propylene to comonomer and various ratios of TEA cocatalyst to comonomer were unsuccessful. Polymer was obtained, but it contained no detectable HALS comonomer.

COMPARATIVE EXAMPLE 2

Several diferent attempts to copolymerize 4-acetoxy-1-(10-undecenyl)-2,2,6,6-tetramethyl piperidine with propylene following the above glass vessel procedure were unsuccessful.

Thermal and Light Stability Tests (Brabender mixing)

The light and thermal stability of our copolymers was demonstrated in a test in which our preferred copolymer was compared against three other polymer compositions. In Table 3 below, polypropylene homopolymer (Mitsubishi Chemical; MFR=1) containing 0.1 wt% "Irganox 1010" and 0.05% calcium stearate was used for the control sample and compositions 2, 3, and 4. Irganox 1010 is 2,2-bis[[3-[3,5-bis(1,1-dimethylethyl)-4-hydroxyphenyl]-1-oxopropoxy]methyl]-1,3,-propanediyl-3,5-bis(1,1-dimethylethyl)-4-hydroxybenzenepropanoate. Composition 2 contained 0.68% of our copolymer made as described above (Example 1). Composition 3 contained 0.2 part "Tinuvin 770", a commercially available HALS compound having the formula bis(2,2,6,6-tetramethyl-4-piperidinyl) sebacate. Composition 4 contained 0.22 part "Tinuvin 622", which is described by the manufacturer as "dimethyl succinate polymer with 4-hydroxy-2,2,6,6-tetramethyl-1-piperidineethanol." The piperidine group contents of sample 2 was calculated to be $5.4 \times 10^{-6}$ mole/g polymer, while those of samples 3 and 4 were $8.3 \times 10^{-6}$ mole/g polymer sample. The samples were prepared in a Brabender type mixer at 180° C. and compression molded at 230° C. into 0.5 mm thick film. To evaluate the thermal stability of the compositions, a set of sample films was kept at 150° C. until thermal degradation was indicated as shown by cracking on bending. The elapsed times for cracking were listed in Table 3 as a measure of thermal stability. It is clear that our copolymer does not show any negative synergies with the phenolic antioxidant, while commercial HALS considerably decreased the thermal stability, indicative of negative synergy. In the same table, weatherability was tested by exposing the sample films to Xenon arc in a Weather-O-Meter at 80° C. Here again the times for cracks to form on bending were listed as an indication of weatherability in Table 3. The data clearly show a superior performance of our copolymers as light stabilizers, significantly better than commercial HALS.

TABLE 3

Thermal Stability and Weatherability

| Sample | Hindered Amine | Conc. | Thermal Stability | Weatherability |
|---|---|---|---|---|
| Control | — — | | 667 hrs | 200 hrs |
| 2 | Copolymer, Example 1 | 0.68% | 667 | 680 |
| 3 | Tinuvin 770 | 0.20% | 277 | 560 |
| 4 | Tinuvin 622 | 0.22% | 308 | 500 |

Thermal Stability and Weatherability Tests (Extruded Samples)

The thermal stability and light stability of our polymer was further demonstrated in tests in which our copolymer was compared with six other polymer compositions, and the results are shown in Table 4. In Table 4, the control was propylene homopolymer (Mitsubishi Chemical MFR=1) with 0.1% Irganox 1010 and 0.05% calcium stearate as the previous tests. The others were prepared by adding the named additives to the control material. Our preferred comonomer, 1-10UTMP, was also used in the unpolymerized state in this comparison as Sample 7. The addition levels indicated in the table were set to give about $8.3 \times 10^{-6}$ mole/g polymer sample in all samples except Sample 2, containing the copolymer of Example 1 in an amount providing about two thirds as much HALS unit, $5.4 \times 10^{-6}$ mole/g polymer, as the other. The polypropylene was mixed with the additives using a single screw extruder at 230° C. and samples were pressed into film 0.5 mm thick. The samples were kept at 150° C. for the thermal degradation test as indicated for the times of cracking on bending, or developing chalking. For the weatherability test, the samples were exposed to light from a Xenon lamp in a Weather-O-Meter at 80° C. until they cracked on bending.

TABLE 4

| Sample | Hindered Amine | Conc. | Thermal Stability | Weatherability |
|---|---|---|---|---|
| Control | — — | | 577 hrs | 160 hrs |
| 2 | Copolymer Example 1 | 0.68% | 692 | 840 |
| 3 | Tinuvin 770 | 0.20% | 473 | 740 |
| 4 | Tinuvin 622 | 0.22% | 345 | 640 |

TABLE 4-continued

| Sample | Hindered Amine | Conc. | Thermal Stability | Weatherability |
|---|---|---|---|---|
| 5 | Sanol LS 765# | 0.21% | 475 | 720 |
| 6 | Chimassorb 944* | 0.25% | 321 | 640 |
| 7 | 1-10UTMP | 0.24% | 554 | 640 |

*Chimassorb 944 is poly [[6-[(1,1,3,3-tetramethylbutyl)-amino]-s-triazine-2,4-diyl][(2,2,6,6-tetramethyl-4-piperidyl)imino] hexamethylene [(2,2,6,6-tetramethyl-4-piperidyl)imino]]
Sanol LS 765 is decanedioic acid, bis(1,2,2,6,6-pentamethyl-1,4-piperidinyl) ester.

It will be seen that our copolymer is quite effective at both weatherability and heat stabilization and/or at inhibiting heat and/or light degradation of a host resin in a blend; our copolymer was better than polymer compositions including higher equivalents of conventional HALS, and also better than 1.5 times the equivalent amount of unpolymerized 1-10UTMP. In addition, our copolymer does not show any sign of negative synergy with the phenolic antioxidant. Further, a comparison was made of Samples 2 and 3 for bleeding of the active HALS component, as shown in Table 5. The table shows the increase of haze values after exposures in the Weather-O-Meter for 40 hours and 200 hours. The haze was measured by the method of JIS (Japanese Industry Standard) K-7105. The presence or absence of bleeding, determined visually or microscopically, is also included in the table.

TABLE 5

| Sample | Δ Haze (0–40 hours) | Δ Haze (0–200 hours) |
|---|---|---|
| 2 | 7.4; no bleeding | 7.5; no bleeding |
| 3 | 9; bleeding | 15.5; bleeding |

Sample 2 including our copolymer made in Example 1 above as an additive was substantially free of bleeding, while Sample 3 with a commercial HALS showed bleeding after only 40 hours, and it increased after that accompanied by a worsening appearance and increasing haze value.

Further, the yellowing indices (YI) of Sample 2 and Sample 6 of Table 4 were measured by a 5 mm φ beam reflection method, using a Suga SC-3 color tester before and after 600 hours of the weatherability and thermal stability tests. The increases are shown in Table 6.

TABLE 6

| Sample | Δ YI (0–600 hours weatherability test) | Δ YI (0–600 hours thermal stability test) |
|---|---|---|
| 2 | −0.4 | +3.3 |
| 6 | +.06 | +34.7 |

The results show that the copolymer of our invention not only retains mechanical properties against thermal and light degradation, but also retains a low yellowing index.

Thus it is seen that our novel copolymer has high light stability and high heat stability in the presence of phenolic antioxidants; moreover its effect is greater than that of conventional HALS compounds in even larger than equivalent amounts. Our copolymer can be used by itself or blended with other polymers and resins, particularly polypropylene, and will not bleed or migrate as conventional HALS additives are likely to do.

Whether the copolymer is used by itself or blended into a host polyolefin or other resin, the HALS-containing moiety should be present in a practical effective amount, i.e at least $10^{-7}$, up to $10^{-4}$ moles per gram of polymer. Suitable host polyolefins include propylene homopolymers, copolymers (predominantly, i.e. at least 50% by weight propylene) and terpolymers. As indicated above, copolymers and terpolymers of propylene include random and "impact" copolymers with other alpha olefins.

Our invention contemplates the use of our HALS-containing comonomer, particularly 1-(10-undecenyl)-2,2,6,6-tetramethylpiperidine as a polymerized comonomer in polyolefins wherein the lower α-olefins contain 2 to 8 carbon atoms, including branched lower α-olefins such as 4-methyl-1-pentene. Thus the term "lower alpha-olefins" is meant to include branched and unbranched alpha-olefins having from 2 to 8 carbon atoms. We prefer copolymerization with propylene. Conventionally, propylene homopolymers are used for fabricating commercial goods, but other thermoplastics, particularly copolymers comprising predominantly (at least 50%) propylene, may be used. Our copolymers can be used directly in place of such homopolymers and copolymers. Our novel copolymers are compatible with and may be used with other common additives for polyolefins, such as hindered phenols, UV absorbers, hydroxy benzophenones, benzotriazoles, phosphites, and other hindered amines.

We claim:

1. Copolymer of one or more lower alpha-olefins and a heterocyclic ring compound of the formula

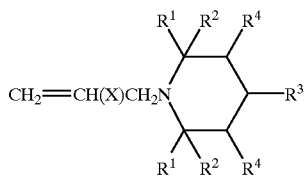

where each $R^1$ is selected from methyl and ethyl groups, each $R^2$ is selected from methyl and ethyl groups, each $R^4$ is hydrogen or methyl, $R^3$ is selected from hydrogen and alkyl, aryl, and aralkyl groups having from 1-8 carbon atoms, (X) is a divalent hydrocarbyl fragment containing from two to twenty carbon atoms, and the remaining 3, 4, and 5 positions are occupied by H.

2. Copolymer of claim 1 wherein the alpha-olefins comprise at least 50 mole percent propylene.

3. Copolymer of claim 1 wherein (X) is $(CH_2)_n$ and n is an integer from 2–11.

4. Copolymer of claim 1 comprising propylene and 1-(10-undecenyl)-2,2,6,6-tetramethylpiperidine.

5. Copolymer of claim 1 comprising about 99.99999 to 85 mole percent propylene and 0.00001–15 mole % said heterocyclic ring compound.

6. Copolymer of claim 1 wherein the $R^1$'s and $R^2$'s are all methyl groups, R3 is H, and each R4 is H.

7. A copolymer comprising 85-99.99999 mole percent propylene and 0.00001-15 mole percent piperidine of the formula

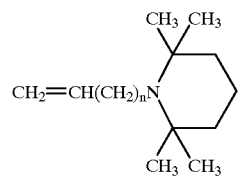

where n is an integer from 3–12.

* * * * *